United States Patent
Hu et al.

(10) Patent No.: US 9,160,701 B2
(45) Date of Patent: Oct. 13, 2015

(54) ADDRESSING METHOD, ADDRESSING APPARATUS, FABRIC MANAGER, SWITCH, AND DATA ROUTING METHOD

(75) Inventors: Yan Hu, Beijing (CN); Yong Xia, Beijing (CN); Yongqiang Liu, Beijing (CN); Quan Huang, Beijing (CN)

(73) Assignee: NEC(CHINA) CO., Ltd., Beijing (CN)

( * ) Notice: Subject to any disclaimer, the term of this patent is extended or adjusted under 35 U.S.C. 154(b) by 1006 days.

(21) Appl. No.: 13/294,636

(22) Filed: Nov. 11, 2011

(65) Prior Publication Data

US 2012/0243403 A1  Sep. 27, 2012

(30) Foreign Application Priority Data

Mar. 24, 2011  (CN) .......................... 2011 1 0077135

(51) Int. Cl.
*H04L 12/28* (2006.01)
*H04L 29/12* (2006.01)
*H04L 12/753* (2013.01)

(52) U.S. Cl.
CPC .............. *H04L 61/103* (2013.01); *H04L 45/48* (2013.01); *H04L 61/2038* (2013.01)

(58) Field of Classification Search
CPC ... H04L 12/2416; H04L 12/243; H04L 45/02; H04L 41/12
See application file for complete search history.

(56) References Cited

U.S. PATENT DOCUMENTS

| | | | | |
|---|---|---|---|---|
| 5,926,101 | A * | 7/1999 | Dasgupta ...................... | 370/408 |
| 6,553,504 | B1 * | 4/2003 | Katzenelson et al. ........ | 713/401 |
| 2005/0152289 | A1 * | 7/2005 | Nagata et al. ................. | 370/256 |
| 2008/0165705 | A1 | 7/2008 | Umayabashi et al. | |
| 2010/0149983 | A1 * | 6/2010 | Lee et al. ...................... | 370/235 |
| 2010/0161524 | A1 * | 6/2010 | Amid et al. .................... | 706/12 |
| 2011/0032825 | A1 * | 2/2011 | Minkenberg et al. ......... | 370/238 |

FOREIGN PATENT DOCUMENTS

| | | | |
|---|---|---|---|
| CN | 101136782 A | | 3/2008 |
| CN | 101330405 A | | 12/2008 |

OTHER PUBLICATIONS

Office Action, dated May 27, 2014, issued by the State Intellectual Property Office of the People's Republic of China, in counterpart Application No. 201110077135.4.
Albert Greenberg, et al., "VL2: A Scalable and Flexible Data Center Network", SIGCOMM'09, Aug. 17-21, 2009, 12 pages, Barcelona, Spain.
Radhika Niranjan Mysore, et al. "Portland: A Scalable Fault-Tolerant Layer 2 Data Center Network Fabric", SIGCOMM'09, Aug. 17-21, 2009, 12 pages, Barcelona, Spain.
Mohammad Al-Fares, et al., "A Scalable, Commodity Data Center Network Architecture", SIGCOMM'08, Aug. 17-22, 2008, 12 pages, Seattle, Washington.

* cited by examiner

*Primary Examiner* — Alvin Zhu
(74) *Attorney, Agent, or Firm* — Sughrue Mion, PLLC (57) ABSTRACT

The present disclosure provides an addressing method, an addressing apparatus, a fabric manager, a switch, and a data routing method for data center networks. The addressing apparatus includes a tree creating unit for, sequentially with each of switches as a root, creating a tree containing all hosts by means of network topology discovery function, to obtain a plurality of trees; a tree selecting unit for selecting a tree having a minimum height among the created plurality of trees; and an address assigning unit for assigning addresses to each of switches and each of hosts in a network with respect to each selected tree having a minimum height. The present disclosure is adaptable to various topologies employed by the data center. The present disclosure can achieve aggregation of locator addresses so that a forwarding table can be shortened, and can achieve load balance of the network.

20 Claims, 10 Drawing Sheets

ADDRESSING METHOD, ADDRESSING APPARATUS, FABRIC MANAGER, SWITCH, AND DATA ROUTING METHOD

TECHNICAL FIELD

The present disclosure relates to data center networks, particularly to an addressing method, an addressing apparatus, a fabric manager, a switch, and a data routing method for the data center networks, which are adaptable to various topologies employed by the data center. The present disclosure can achieve aggregation of locator addresses so that a forwarding table can be shortened, and which can achieve load balance of the network.

BACKGROUND

Cloud services are driving the creation of data centers that hold tens to hundreds of thousands of servers. Additionally, a data center concurrently supports multiple distinct applications, some of which require bandwidth-intensive all-to-all communications among servers in the data center. The large scale and the development of applications bring challenges to the network fabric of a data center.

Objects of a data center network involve interconnecting a number of data center servers and providing efficient and fault-tolerant routing and forwarding services to high-level applications. There are mainly two choices for data center network fabric, i.e. layer-2 network and layer-3 network.

In a layer-2 network, a data center is regarded as a single Ethernet. Ethernet makes network management easy (plug-and-play, seamless virtual machine migration, etc). However, Ethernet cannot scale to networks with tens of thousands of servers.

Layer-3 approach can overcome the scalability problem, but it sacrifices Ethernet's simplicity and imposes administrative burden.

New methods and systems are proposed by researchers to address the scalability problem of Ethernet, for supporting a "plug-and-play", large-scale data center network.

Ethernet is a common LAN (Local Area Network) technology in use today. It identifies nodes in the network with MAC addresses. Different from a hierarchical structure of IP addresses, a MAC address has a flat structure and is unique worldwide. A forwarding table in a switch stores mapping records from destination MAC addresses to outgoing ports.

Figure 1:
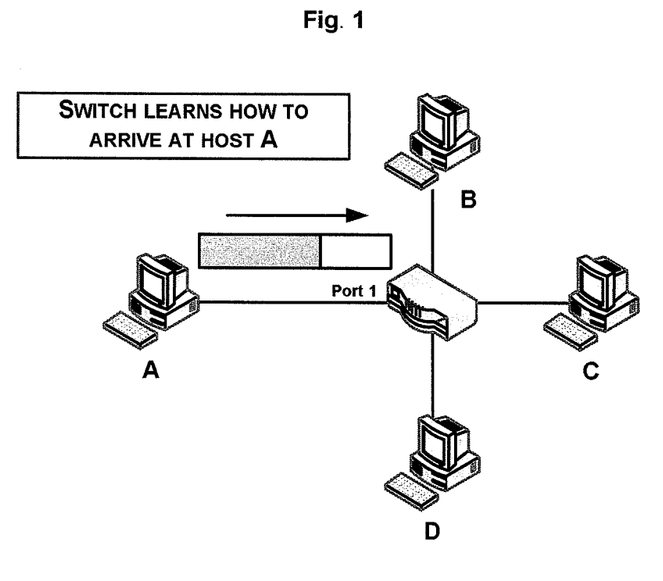
FIG. 1 is a schematic diagram for illustrating creation of a forwarding table by a switch in a self-learning manner.

FIG. 1 is a schematic diagram for illustrating creation of a forwarding table by a switch in a self-learning manner. When a data frame arrives at a switch, the switch checks source MAC address of the data frame and stores in a forwarding table a mapping between the source MAC address and a port into which the data frame comes. By virtue of the self-learning mechanism and use of MAC address, network management becomes easier and the switch is capable of "plug-and-play".

Figure 2:
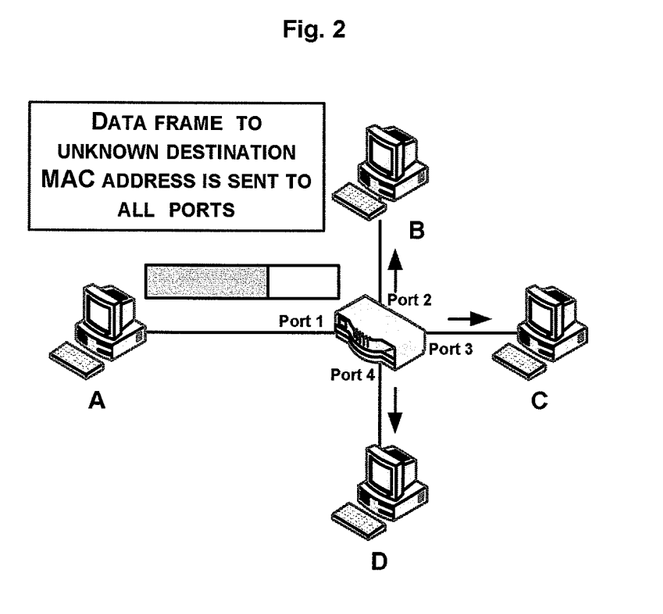
FIG. 2 is a schematic diagram for illustrating forwarding (broadcasting) of a data frame having a unknown destination MAC address by a switch.

However, Ethernet cannot be scaled to networks with tens of thousands of servers for the following reasons. Firstly, MAC addresses are not hierarchical and thus multiple MAC addresses cannot be aggregated together. Since a forwarding table of a switch stores mapping records between destination MAC addresses and outgoing ports, MAC addresses of all hosts in the entire network need to be stored in the forwarding table of each switch. Buffer size of the switch limits the number of hosts in the network. Secondly, for a data frame having an unknown destination MAC address (the destination MAC address is not stored in the forwarding table), the switch sends (broadcasts) it to all ports except the port at which the data frame arrives, as shown in FIG. 2. In addition, some basic network services (such as Address Resolution Protocol, Dynamic Host Configuration Protocol, etc) are performed by broadcasting. This broadcasting mechanism also restrains Ethernet from expanding to a large scale. Finally, Ethernet uses Spanning Tree Protocol (STP) to avoid loops, but forwarding along a single tree results in inefficient routing and unbalancing link loads.

Thus, a data center network cannot be constructed as a large LAN. One solution is to employ a mixture of layer-2 and layer-3 configurations. That is, a data center is constructed as a plurality of LANs which are connected by IP routes. Each LAN consists of tens or hundreds of machines and forms an IP subnet. The mixture of layer-2 and layer-3 configurations can overcome the scalability problem, but it sacrifices Ethernet's simplicity and imposes administrative burden. An object of the present disclosure lies in solving the scalability problem of Ethernet so as to support a "plug-and-play", large-scale data center network.

Reference 1 proposes PortLand protocol, i.e. a set of layer-2 addressing, routing and forwarding protocols for data center networks. According to this protocol, Pseudo MAC (PMAC) addresses are assigned to all hosts in the network to encode their position in the topology. PMAC addresses enable efficient forwarding with less switch states. Below, a more detailed description of the PortLand system is given.

Figure 3:
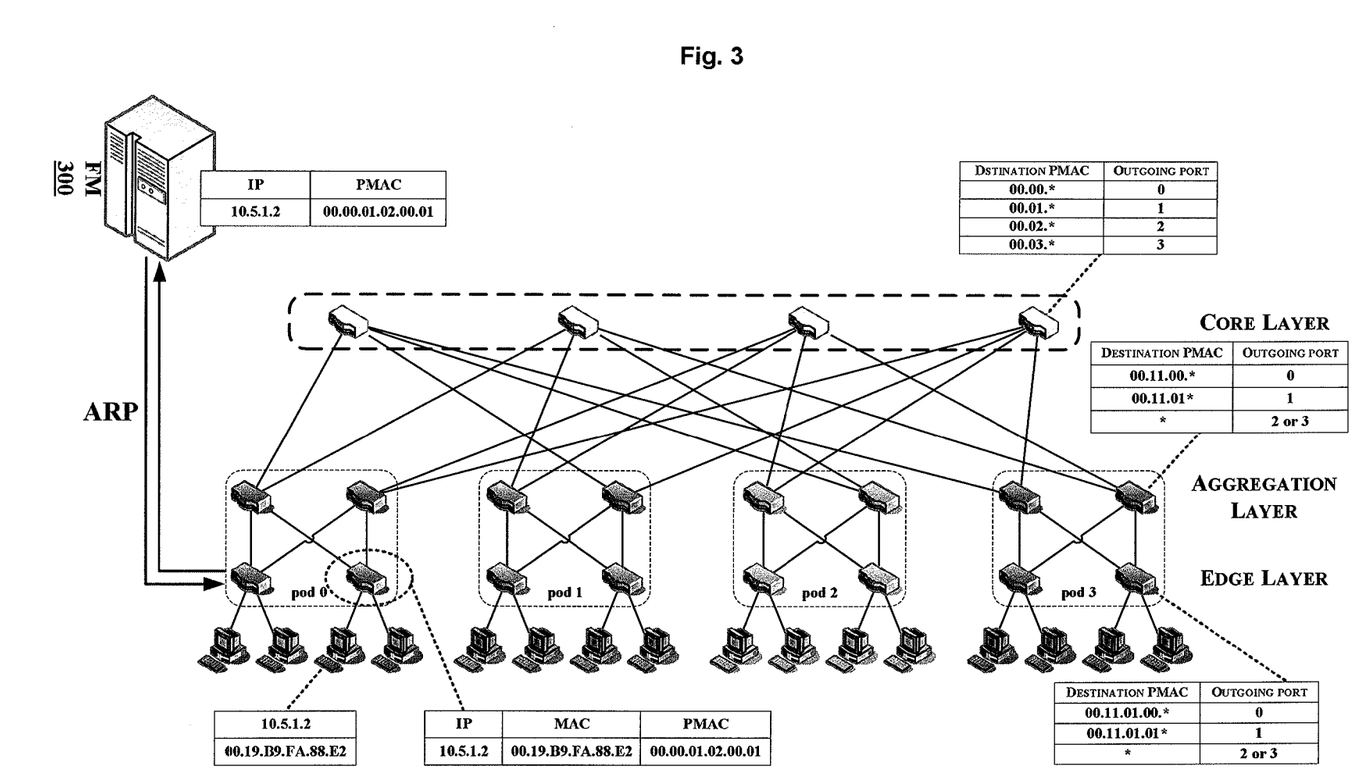
FIG. 3 is a schematic diagram of architecture of a PortLand system.

FIG. 3 is a schematic diagram of architecture of a PortLand system.

In the PortLand system, each end host is assigned a PMAC (for example, PMAC "00.00.01.02.00.01" is assigned to an end host having MAC address of "00.19.B9.FA.88.E2" and IP address of "10.5.1.2", as shown in FIG. 3), which encodes the location of the end host in the topology. The PMAC addresses but not the actual MAC addresses are stored in the forwarding table for forwarding data packets. PMAC addresses are hierarchical and thus the switches can maintain smaller forwarding tables. Additionally, the PortLand system introduces a centralized fabric manager (FM) 300 which maintains configuration information and state of the network. Contrary to the pure broadcasting mechanism in conventional Ethernet, FM 300 can facilitate ARP resolution and improve performance of fault tolerance.

The PortLand protocol comprises a set of addressing, routing and forwarding protocols based on Fat Tree topology (see Reference 3). In Fat Tree topology, switches are divided into three layers: edge layer, aggregation layer and core layer. All switches in respective layers are identical, each including k ports. FIG. 3 shows a Fat Tree topology with k=4. The fat tree is split into k individual pods. As shown in dotted line boxes of edge layer and aggregation layer in FIG. 3, a pod is formed by k switches in each box. In general, the fat tree can support non-blocking communications among $k^3/4$ hosts by using $5k^2/4$ individual k-port switches.

Edge switches assign respective 48-bit PMAC addresses to all directly connected hosts, respectively. PMAC addresses are hierarchical and encode locations of hosts in the topology. The format of PMAC address is as follows:

pod.position.port.vmid wherein

'pod' has 16 bits and represents the pod number of the edge switch,

'position' has 8 bits and indicates the position of the edge switch in the pod,

'port' has 8 bits and represents the port number of the edge switch the host connected to, and 'vmid' has 16 bits and indicates the number of virtual machine on the physical machine (there may be a plurality of virtual machines on the same physical machine).

In the example shown in FIG. 3, the third host from left has a PMAC address of "00.00.01.02.00.01", wherein pod '00.00' indicates pod 0,
position '01' represents position 01 in pod 0,
port '02' indicates that the end host is connected to port 02 of the edge switch, and
vmid '00.01' indicates that virtual machine in the end host has a number of 1.

As shown in FIG. 3, the PMAC addresses but not the actual MAC address are stored in the forwarding table (shown in the table on right side of FIG. 3) for forwarding data packets. Contrary to the flat structure of MAC addresses, PMAC addresses are hierarchical and thus the switches only need to maintain smaller forwarding tables. The forwarding tables of switches in respective layers are as follows:

In core switch: pod.*↔ outgoing port For example, ports 0 and 1 of the core switch of FIG. 3 on the most right side are connected to pod 0 and 1 respectively. Therefore, all data packets having destination MAC addresses "00.00.*" are sent to port 0, which means that all data packets destined to pod 0 are sent to port 0. Similarly, all data packets destined to pod 1 are sent to port 1.

In aggregation switch: pod.position.*↔ outgoing port For example, the aggregation switch of FIG. 3 on the most right side belongs to pod 3, i.e. 00.11. Thus, all data packets having destination MAC addresses "00.11.*" are sent to this pod 3, wherein all data packets having destination MAC addresses "00.11.00.*" are sent to the edge switch with position '0' (i.e. port 0), and all data packets having destination MAC addresses "00.11.01.*" are sent to the edge switch with position '1' (i.e. port 1). Data packets having other destination MAC addresses are sent to other pods through port 2 or port 3 as uplink data packets.

In edge switch: pod.position.port.*↔ outgoing port For example, the edge switch of FIG. 3 on the most right side belongs to pod 3, position 1, i.e. 00.11.01. It has two hosts directly connected thereto, wherein all data packets having destination MAC addresses of "00.11.01.00.*" are sent to port 0, and all data packets having destination MAC addresses "00.11.01.01.*" are sent to port 1. Data packets having other destination MAC addresses are sent to other hosts through port 2 or port 3 as uplink data packets.

The PortLand protocol comprises a set of layer-2 addressing, routing and forwarding protocols for data center networks. However, the PortLand protocol is limited to this Fat Tree topology and cannot be applied to other topologies. For example, the format of PMAC used by the PortLand protocol, pod.position.port.vmid, cannot be directly applied to Clos topology as proposed in Reference 2.

Figure 4:
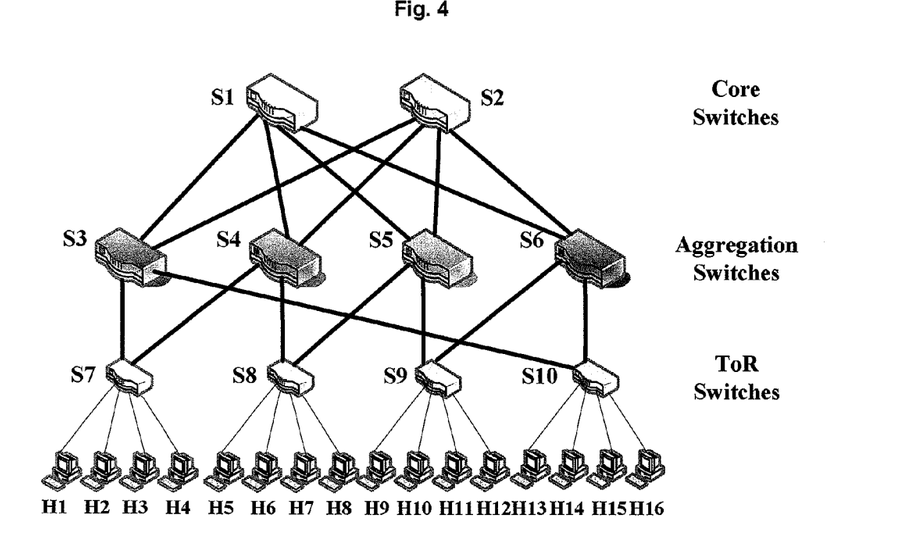
FIG. 4 is a schematic diagram of Clos topology.

FIG. 4 is a schematic of Clos topology. Clos topology is also divided into three layers, wherein Top of Rack (ToR) switches are similar to edge switches in Fat Tree topology which are connected to end hosts directly. All switches in Fat Tree topology are identical. In Clos topology, however, core switches and aggregation switches are switches with 10G ports, and ToR switches are connected to the aggregation switches via 10G uplink ports but to hosts via 1G downlink ports.

There is no concept of pod in Clos topology. Thus, the format of PMAC (pod.position.port.vmid) cannot be utilized directly. If an aggregation switch corresponds to a pod (for example, aggregation switches S3 and S4 correspond to pod 0 and pod 1 respectively), the ToR switches cannot be addressed. Since each ToR switch is connected to two aggregation switches, such as ToR switch S7 connected to aggregation switches S3 and S4, the pod number of ToR switch S7 may be 0 or 1. Consequently, the PortLand protocol proposed in Reference 1 cannot be directly applied into Clos topology proposed in Reference 2.

REFERENCES

[1] "PortLand: A Scalable Fault Tolerant layer-2 Data Center Network Fabric", Radhika Niranjan Mysore etc., in Sigcomm 2009
[2] "VL2: A Scalable and Flexible Data Center Network", Albert Greenberg etc., in Sigcomm 2009
[3] "A Scalable, Commodity Data Center Network Architecture", M. Al-Fares etc., in Sigcomm 2008

SUMMARY

In view of the aforesaid disadvantages in prior art, the object of the present disclosure is to provide an addressing method, an addressing apparatus, a fabric manager, a switch, and a data routing method for data center networks, which are adaptable to various topologies employed by the data center. The present disclosure can achieve aggregation of locator addresses so that a forwarding table can be shortened, and can achieve load balance of the network.

The present disclosure provides an addressing method, an addressing apparatus, a fabric manager, a switch, and a data routing method for data center networks. Hosts and switches in the network are assigned one or more locator addresses. The locator addresses are hierarchical and encode positions of the hosts and switches in the topology. When the topology provides redundant paths, the switches and the hosts are assigned multiple locator addresses. The locator addresses but not MAC addresses are stored in a forwarding table of a switch for forwarding data packets. Multiple locator addresses indicate multiple paths. Appropriate paths are selected from the multiple paths for load balance.

According to the first aspect of the present disclosure, an addressing apparatus is provided comprising: a tree creating unit for, sequentially with each of switches as a root, creating a tree containing all hosts by means of network topology discovery function, to obtain a plurality of trees; a tree selecting unit for selecting a tree having a minimum height among the plurality of trees created by the tree creating unit; and an address assigning unit for assigning addresses to each of switches and each of hosts in a network with respect to each tree having a minimum height selected by the tree selecting unit.

Preferably, when several trees containing all the hosts are able to be created with one switch as a root, the tree creating unit selects any one of trees having a minimum height among the several trees with the switch as the root to be the created tree.

Preferably, when several trees containing all the hosts are able to be created with one switch as a root, the tree creating unit records all of the several trees to be the created tree.

Preferably, when there are several trees having a minimum height among the plurality of trees, the tree selecting unit selects all of the several trees having a minimum height.

Preferably, for each tree having a minimum height H selected by the tree selecting unit, the address assigning unit assigns a root switch locator address to a root switch located at the root of the tree, which root switch is also called as the $0^{th}$ layer switch; beginning with the $1^{st}$ layer switches directly connected to the root switch, for each $i^{th}$ layer switch directly connected to the $(i-1)^{th}$ layer switch, finds all paths from the root switch to the $i^{th}$ layer switch, and with respect to each path, assigns an $i^{th}$ layer switch locator address to the $i^{th}$ layer switch with a format of "root switch locator address.$1^{st}$ layer switch address ... $i^{th}$ layer switch address", wherein $1 \leq i \leq H-2$; and assigns a host locator address to each host with a format of "edge switch locator address.host address", wherein the edge switch is the $k^{th}$ layer switch directly connected to the host, $0 \leq k \leq H-2$.

Preferably, the $i^{th}$ layer switch address is a port number of a respective port connecting to each $i^{th}$ layer switch of the $(i-1)^{th}$ layer switch.

Preferably, the host address is a port number of a respective port connecting to each host of the edge switch.

According to the second aspect of the present disclosure, an addressing method is provided comprising: sequentially with each of switches as a root, creating a tree containing all hosts by means of network topology discovery function, to obtain a plurality of trees; selecting a tree having a minimum height among the created plurality of trees; and assigning addresses to each of switches and each of hosts in a network with respect to each selected tree having a minimum height.

Preferably, when several trees containing all the hosts are able to be created with one switch as a root, any one of trees having a minimum height among the several trees with the switch as the root is selected to be the created tree.

Preferably, when several trees containing all the hosts are able to be created with one switch as a root, all of the several trees are recorded to be the created tree.

Preferably, when there are several trees having a minimum height among the plurality of trees, all of the several trees having a minimum height are selected.

Preferably, for each selected tree having a minimum height H, a root switch locator address is assigned to a root switch located at the root of the tree, which root switch is also called as the $0^{th}$ layer switch; beginning with the $1^{st}$ layer switches directly connected to the root switch, for each $i^{th}$ layer switch directly connected to the $(i-1)^{th}$ layer switch, all paths are found from the root switch to the $i^{th}$ layer switch, and with respect to each path, an $i^{th}$ layer switch locator address is assigned to the $i^{th}$ layer switch with a format of "root switch locator address.$1^{st}$ layer switch address ... $i^{th}$ layer switch address", wherein $1 \leq i \leq H-2$; and a host locator address is assigned to each host with a format of "edge switch locator address.host address", wherein the edge switch is the $k^{th}$ layer switch directly connected to the host, $0 \leq k \leq H-2$.

Preferably, the $i^{th}$ layer switch address is a port number of a respective port connecting to each $i^{th}$ layer switch of the $(i-1)^{th}$ layer switch.

Preferably, the host address is a port number of a respective port connecting to each host of the edge switch.

According to the third aspect of the present disclosure, a fabric manager is provided comprising: the addressing apparatus according to the present disclosure; and a storage for storing a global locator address table which includes mappings between an Internet Protocol (IP) address of each host and all host locator addresses of the host.

Preferably, the fabric manager further comprises a scheduling unit for searching the global locator address table with an IP address of a destination host as an index upon an Address Resolution Protocol (ARP) request is received, and based on a scheduling algorithm, selecting one host locator address among the searched out one or more host locator addresses corresponding to the IP address of the destination host, and returning the selected one host locator address to a source host to complete ARP address resolution.

More preferably, if no host locator address corresponding to the IP address of the destination host is searched out from the global locator address table, the scheduling unit performs a network broadcast to obtain one or more host locator addresses of the destination host, and then, based on a scheduling algorithm, selects one host locator address among the obtained one or more host locator addresses corresponding to the IP address of the destination host, and returning the selected one host locator address to the source host to complete ARP address resolution.

More preferably, the fabric manager further comprises a failure processing unit for, upon a switch's detecting its adjacent switch failure or link failure, invalidating a relevant host locator address in the global locator address, wherein the scheduling unit will not select an invalidated host locator address upon selecting a host locator address corresponding to the IP address of the destination host.

According to the fourth aspect of the present disclosure, a switch is provided comprising the addressing apparatus according to the present disclosure.

According to the fifth aspect of the present disclosure, a data routing method in which switch addresses and host addresses addressed by the addressing method according to the present disclosure are adopted is provided. The data routing method comprising: a root switch/a $0^{th}$ layer switch sends a data packet containing "root switch locator address.$1^{st}$ layer switch address/host address.*" as a host locator address of a destination host to a port numbered as "$1^{st}$ layer switch address/host address"; an $i^{th}$ layer switch sends a data packet containing "$i^{th}$ layer switch locator address.$(i+1)^{th}$ layer switch address/host address.*" as a host locator address of a destination host to a port numbered as "$(i+1)^{th}$ layer switch address/host address", wherein $1 \leq i \leq H-2$; and an $i^{th}$ layer switch sends a data packet containing "root switch locator address.*" as a host locator address of a destination host to a port connected to an $(i-1)^{th}$ layer switch whose root is a root switch having a root switch locator address of "root switch locator address", wherein $1 \leq i \leq H-2$.

The present disclosure provides a new addressing solution which is adaptable to various topologies employed by a data center, such as Fat Tree topology, Clos topology, etc. The locator addresses but not the MAC addresses are stored in a forwarding table of a switch for forwarding data packets. Since the locator addresses are hierarchical, switches can maintain smaller forwarding tables. When the topology provides redundant paths, the switches and the hosts are assigned multiple locator addresses. The multiple locator addresses indicate multiple paths respectively. Appropriate paths may be selected from the multiple paths for load balance.

BRIEF DESCRIPTION OF THE DRAWINGS

The above and other objects, features, and advantages of the present disclosure will be clear through the following description of embodiments of the present disclosure, in conjunction with drawings in which.

Throughout the drawings, the same or similar elements or steps are identified by the same or similar reference signs.

DETAILED DESCRIPTION OF EMBODIMENTS

In the following, embodiments of the present disclosure will be detailed in conjunction with the drawings and the principles and implementations of the present disclosure will become apparent to those skilled in the art. However, the present disclosure is not limited to the particular embodiments as described below. Moreover, common elements related to the present disclosure are not described for the sake of clarity and simplicity.

Figure 5:
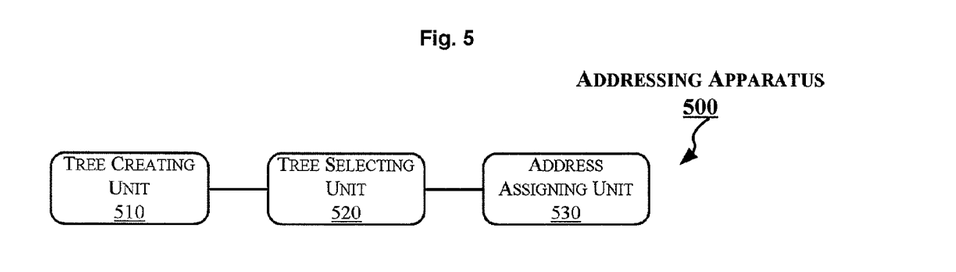
FIG. 5 is a block diagram of an addressing apparatus 500 according to the present disclosure.

FIG. 5 is a block diagram of an addressing apparatus 500 according to the present disclosure. The addressing apparatus 500 according to the present disclosure may be disposed in the fabric manager 300 shown in FIG. 3 or any switch. As shown in FIG. 5, the addressing apparatus 500 according to the present disclosure comprises a tree creating unit 510, a tree selecting unit 520, and an address assigning unit 530.

The tree creating unit 510, sequentially with each of switches as a root, creates a tree containing all hosts by means of network topology discovery function, to obtain a plurality of trees. Since the topology may provide redundant paths, it is not necessary for each tree to contain all of the switches. In addition, several trees containing all hosts may be created with one switch as a root. In this situation, the tree creating unit 510 may select any one of trees having a minimum height among the several trees with the switch as the root to be the created tree before operation of the tree selecting unit 520. Alternatively, the tree creating unit 510 may create and record all of the trees which then may be selected by the tree selecting unit 520.

The tree selecting unit 520 selects a tree having a minimum height among the plurality of trees created by the tree creating unit 510. When there are several trees having a minimum height among the plurality of trees, the tree selecting unit 520 selects all of the several trees having a minimum height. According to the operation of the tree selecting unit 520, the topology is constructed as a multi-root tree when there are several trees having the same minimum height.

The address assigning unit 530 assigns addresses to each of switches and each of hosts in a network.

For the sake of convenience, the hierarchical structure of the switches in the network will be described firstly.

A switch located at a root node of each tree is called as a root switch (also referred to as a $0^{th}$ layer switch). A switch connected directly to an $(i-1)^{th}$ layer switch is called as $i^{th}$ an layer switch ($1 \le i \le H-2$, H being height of the tree). A switch connected directly to a host is called as an edge switch (which may be a $k^{th}$ layer switch, $0 \le k \le H-2$).

Firstly, with respect to each selected tree having the minimum height, a root switch locator address is assigned to a root switch located at the root of the tree, which root switch is also called as the $0^{th}$ layer switch.

Then, beginning with the $1^{st}$ layer switches directly connected to the root switch (the $0^{th}$ layer switch), for each $i^{th}$ layer switch, all paths from the root switch to the $i^{th}$ layer switch are found, and with respect to each path, an $i^{th}$ layer switch locator address is assigned to the $i^{th}$ layer switch with a format of "root switch locator address.$1^{st}$ layer switch address . . . $i^{th}$ layer switch address", wherein the $i^{th}$ layer switch address is a port number of a respective port connecting to the $i^{th}$ layer switch of the $(i-1)^{th}$ layer switch.

Finally, a host locator address is assigned to each host with a format of "edge switch locator address.host address", wherein the host address may be a port number of a respective port connecting to each host of the edge switch.

Figure 6:
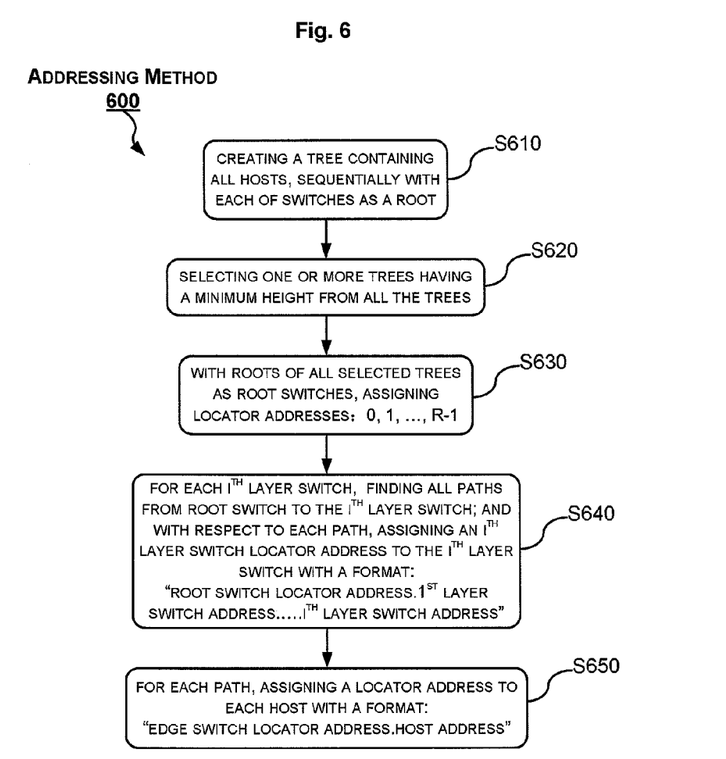
FIG. 6 is a flowchart of an addressing method 600 according to the present disclosure.

FIG. 6 is a flowchart of an addressing method 600 according to the present disclosure.

At step S610, the tree creating unit 510, sequentially with each of switches as a root, creates a tree containing all hosts by means of network topology discovery function, to obtain a plurality of trees. Since the topology may provide redundant paths, it is not necessary for each tree to contain all of the switches. In addition, several trees containing all hosts may be created with one switch as a root. In this situation, the tree creating unit 510 may select any one of trees having a minimum height among the several trees with the switch as the root to be the created tree before operation of the tree selecting unit 520. Alternatively, the tree creating unit 510 may create and record all of the trees which then may be selected by the tree selecting unit 520.

At step S620, the tree selecting unit 520 selects a tree having a minimum height among the plurality of trees created by the tree creating unit 510. When there are several trees having a minimum height among the plurality of trees, the tree selecting unit 520 selects all of the several trees having a minimum height. According to the operation of the tree selecting unit 520, the topology is constructed as a multi-root tree when there are several (R) trees having the same minimum height. The height of the multi-root tree is H. A switch located at a root node of each tree is called a root switch (also referred to as a $0^{th}$ layer switch). A switch connected directly to a $(i-1)^{th}$ layer switch is called an $i^{th}$ layer switch ($1 \le i \le H-2$). A switch connected directly to a host is called an edge switch (which may be a $k^{th}$ layer switch, $0 \le k \le H-2$).

At step S630, with respect to each selected tree having the minimum height H, the address assigning unit 530 assigns a root switch locator address to a root switch located at the root of the tree, which root switch is also called as the $0^{th}$ layer switch. For example, root switch locator addresses "0", "1", . . . , "R−1" may be assigned to root nodes of the trees sequentially.

At step S640, beginning with the $1^{st}$ layer switches directly connected to the root switch (the $0^{th}$ layer switch), for each $i^{th}$ layer switch, the address assigning unit 530 finds all paths from the root switch to the $i^{th}$ layer switch, and with respect to each path, assigns an $i^{th}$ layer switch locator address to the $i^{th}$ layer switch with a format of "root switch locator address.$1^{st}$ layer switch address . . . $i^{th}$ layer switch address", wherein the $i^{th}$ layer switch address is a port number of a respective port connecting to the $i^{th}$ layer switch of the $(i-1)^{th}$ layer switch.

At step S650, the address assigning unit 530 assigns a host locator address to each host with a format of "edge switch locator address.host address", wherein the host address may be a port number of a respective port connecting to the host of the edge switch.

For the locator address of "root switch locator address.$1^{st}$ layer switch address . . . $i^{th}$ layer switch address . . . edge switch locator address.host address", each layer of the locator address may be indicated by 8 bits. Thus, if the height H of a multi-root tree obtained by the topology discovery function is less than 6, the length of the locator address does not go beyond MAC address space of 48 bits.

If the locator address does not reach all the 6 layers (48 bits), invalid address bits are indicated with "1"s (which can be achieved by the address assigning unit 530). For example, "0.1.2.3.255.255" indicates that the format of locator address of a host is "root switch locator address.$1^{st}$ layer address. $2^{nd}$ layer address.host address", and its particular value is "0.1.2.3". In the context of the description, the invalid address bits are usually omitted for the sake of simplicity. That is, "0.1.2.3" represents "0.1.2.3.255.255".

The size of address space of "root switch locator address" depends on the number of the root switches. Eight bits can represent up to 255 root switches. Usually, switches in the core layer are switches with 10G ports. It is assumed that there are 255 switches in the core layer each of which has 128 ports. Thus, this configuration can support 1 G communications for 255*128*10=326,400 hosts. Of course, this number can meet requirement of a large scale data center.

In addition to "root switch locator address", the size of address space of "$1^{st}$ layer address", "$2^{nd}$ layer address", . . . , "$n^{th}$ layer address", or "host address" depends on the number of ports of switches. Eight bits can represent up to 255 ports, which can fulfill requirements of existing switches.

On the other hand, if the height H of a multi-root tree obtained by the topology discovery function is larger than 6, the locator address of "root switch locator address. $1^{st}$ layer switch address . . . $i^{th}$ layer switch address . . . edge switch locator address.host address" should be compressed. It is assumed the maximum address space of a certain layer $\leq 2^N-1$, the number of bits of this layer will be compressed into N bits (which can be achieved by the address assigning unit 530). In this situation, fabric manager 300 (FIG. 3) will notify all the switches about the length of bits of each layer after completion of topology discovery, because each layer is no longer indicated by fixed length of bits (8 bits).

The addressing solution proposed in the present disclosure is adaptable to various topologies employed by the data center. Examples of addressing in typical topologies are given below.

Figure 7:
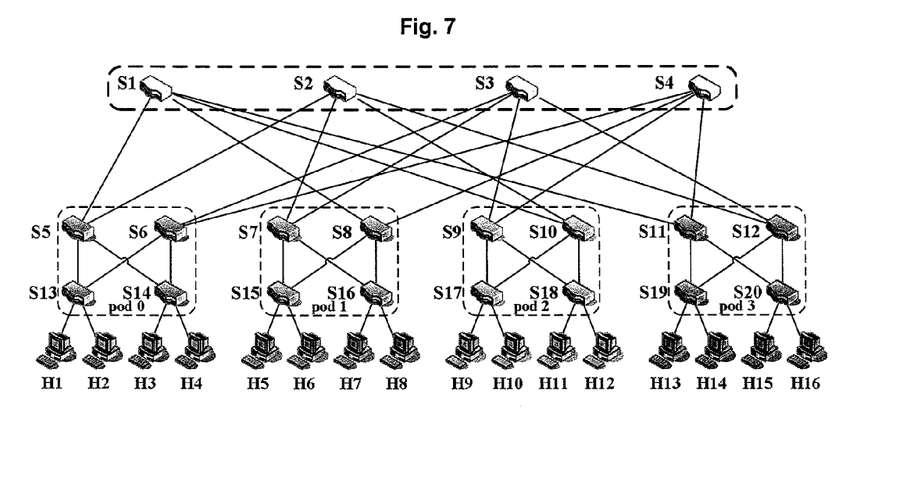
FIG. 7 is a schematic diagram for illustrating Fat Tree topology as proposed in Reference 3.

FIG. 7 is a schematic for illustrating Fat Tree topology as proposed in Reference 3. Detailed description may refer to FIG. 3 and thus is omitted for simplicity.

Figure 8:
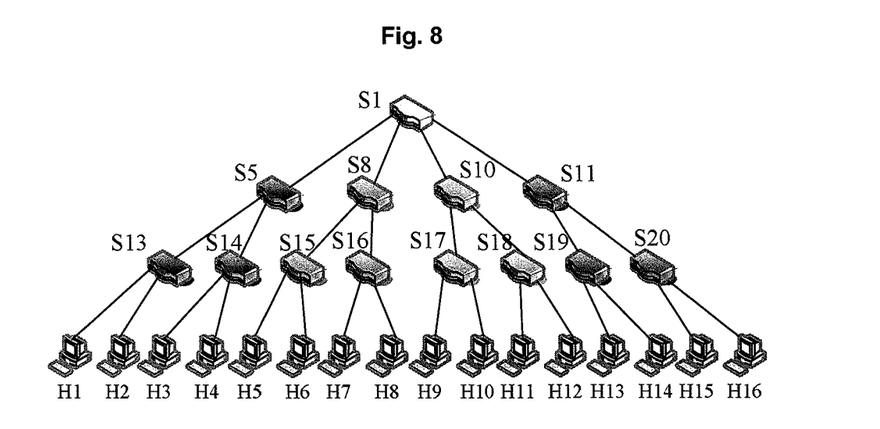
FIG. 8 shows an example of a tree created by network topology discovery function based on Fat Tree topology.

FIG. 8 shows an example of a tree created by network topology discovery function based on Fat Tree topology.

As shown in FIG. 8, the tree creating unit 510 creates a tree containing all hosts by means of network topology discovery function, with switch S1 as a root (step S610). The height H of the tree is 4.

Figure 9:
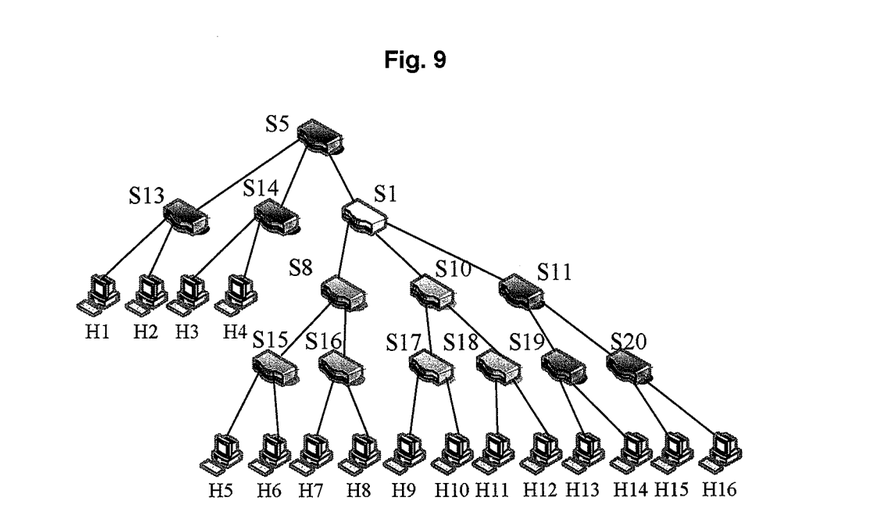
FIG. 9 shows another example of a tree created by network topology discovery function based on Fat Tree topology.

FIG. 9 shows another example of a tree created by network topology discovery function based on Fat Tree topology.

As shown in FIG. 9, the tree creating unit 510 creates another tree containing all hosts by means of network topology discovery function, with switch S5 as a root (step S610). The height H of the tree is 5.

Figure 10:
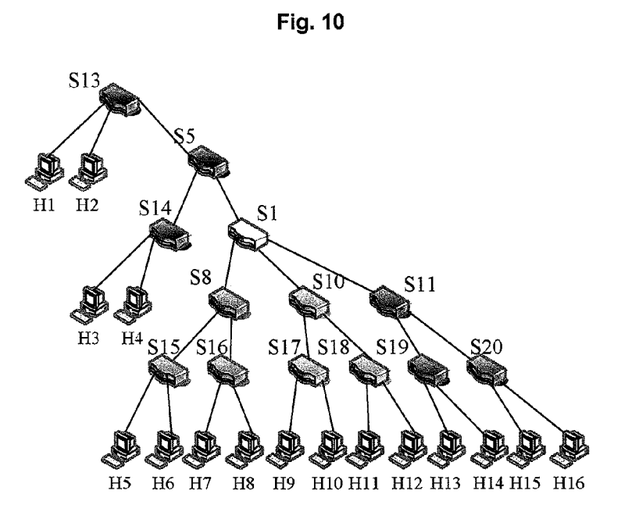
FIG. 10 shows another example of a tree created by network topology discovery function based on Fat Tree topology.

FIG. 10 shows another example of a tree created by network topology discovery function based on Fat Tree topology.

As shown in FIG. 10, the tree creating unit 510 creates another tree containing all hosts by means of network topology discovery function, with switch S13 as a root (step S610). The height H of the tree is 6.

According to above operation, the tree creating unit 510 may create at least 20 trees for the Fat Tree topology shown in FIG. 7.

Figure 11:
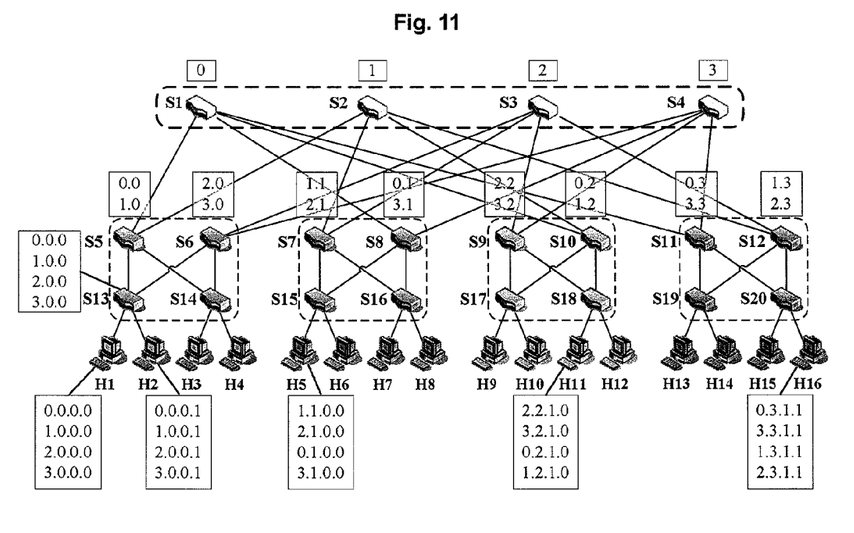
FIG. 11 shows a portion of addressing results based on Fat Tree topology.

FIG. 11 shows a portion of addressing results based on Fat Tree topology.

The tree selecting unit 520 selects a tree having a minimum height (H=4) among the at least 20 trees created by the tree creating unit 510. There are four trees having the minimum height H=4, with switches S1, S2, S3, and S4 as roots respectively (step S620).

Thus, the address assigning unit 530 assigns locator addresses "0", "1", "2", and "3" to the four switches S1, S2, S3, and S4 which are root switches (step S630).

Switches S5-S12 are connected to root switches directly and thus are $1^{st}$ layer switches. For each of the $1^{st}$ layer switches, there are two paths from root switches to the $1^{st}$ layer switch. Therefore, two locator addresses are assigned to each of the $1^{st}$ layer switches. For instance, as for switch S5, one path is S1→S5. Assuming that the switch S5 is connected to port 0 of the root switch S1, then the switch locator address obtained by switch S5 for this path is "0.0". The other path from root switches to switch S5 is S2→S5. Assuming that the switch S5 is connected to port 0 of the root switch S2, then the switch locator address obtained by switch S5 for this path is "1.0". Switches S13-S20 are connected to the $1^{st}$ layer switches directly and thus are $2^{nd}$ layer switches. For each of the $2^{nd}$ layer switches, there are four paths from root switches to the $2^{nd}$ layer switch. Thus, each of the $2^{nd}$ layer switches is assigned four locator addresses. For instance, the four paths for switch S13 are S1→S5→S13, S2→S5→S13, S3→S6→S13, and S4→S6→S13, and the corresponding four switch locator addresses are "0.0.0", "1.0.0", "2.0.0", and "3.0.0" (step S630).

Hosts are connected to edge switches (the $2^{nd}$ layer switches) directly. Corresponding to each switch locator address of the edge switches, a host locator address is assigned to a host. Thus, each host shown in FIG. 11 has four host locator addresses. For example, host H1 is connected to port 0 of switch S13. Accordingly, the host locator addresses of the host H1 are "0.0.0.0", "1.0.0.0", "2.0.0.0", and "3.0.0.0", corresponding to four switch locator addresses of the switch S13, i.e. "0.0.0", "1.0.0", "2.0.0", and "3.0.0" (step S640).

Figure 12:
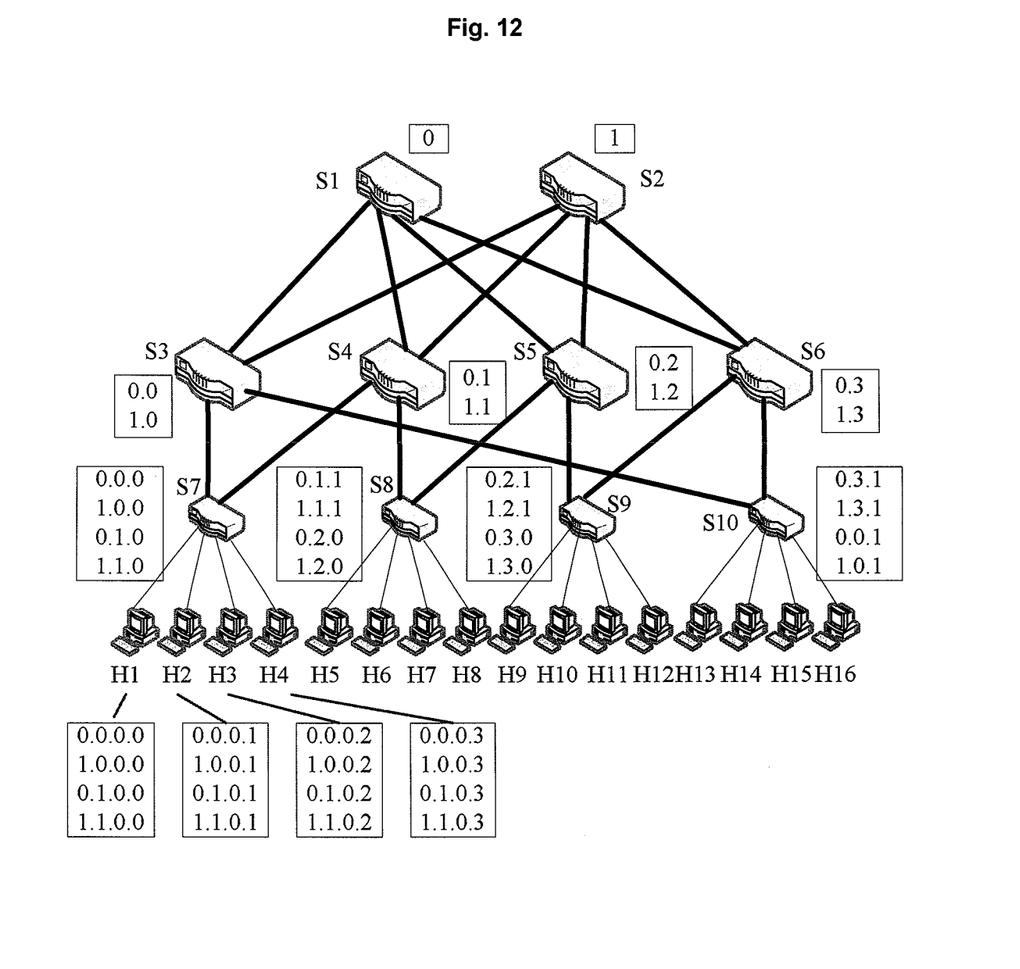
FIG. 12 shows a portion of addressing results based on Clos topology.

FIG. 12 shows a portion of addressing results based on Clos topology.

The tree creating unit 510 may create at least 10 trees for the Clos topology shown in FIG. 12.

The tree selecting unit 520 selects a tree having a minimum height (H=4) among the at least 10 trees created by the tree creating unit 510. There are two trees having the minimum height H=4, with switches S1 and S2 as roots respectively (step S620).

Thus, the address assigning unit 530 assigns locator addresses "0" and "1" to the two switches S1 and S2 which are root switches (step S630).

Switches S3-S6 are connected to root switches directly and thus are $1^{st}$ layer switches. For each of the $1^{st}$ layer switches, there are two paths from root switches to the $1^{st}$ layer switch. Therefore, two locator addresses are assigned to each of the $1^{st}$ layer switches. For instance, as for switch S3, one path is S1→S3. Assuming that the switch S3 is connected to port 0 of the root switch S1, then the switch locator address obtained by switch S3 for this path is "0.0". The other path from root switches to switch S3 is S2→S3. Assuming that the switch S3 is connected to port 0 of the root switch S2, then the switch locator address obtained by switch S3 for this path is "1.0". Switches S7-S10 are connected to the $1^{st}$ layer switches directly and thus are $2^{nd}$ layer switches. For each of the $2^{nd}$ layer switches, there are four paths from root switches to the $2^{nd}$ layer switch. Thus, each of the $2^{nd}$ layer switches is assigned four locator addresses. For instance, the four paths for switch S7 are S1→S3→S7, S2→S3→S7, S1→S4→S7, and S2→S4→S7, and the corresponding four switch locator addresses are "0.0.0", "1.0.0", "0.1.0", and "1.1.0" (step S630).

Hosts are connected to edge switches (the $2^{nd}$ layer switches) directly. Corresponding to each switch locator address of the edge switches, a host locator address is assigned to a host. Thus, each host shown in FIG. 12 has four host locator addresses. For example, host H1 is connected to port 0 of switch S7. Accordingly, the host locator addresses of the host H1 are "0.0.0.0", "1.0.0.0", "0.1.0.0", and "1.1.0.0", corresponding to four switch locator addresses of the switch S7, i.e. "0.0.0", "1.0.0", "0.1.0", and "1.1.0" (step S640).

Figure 13:
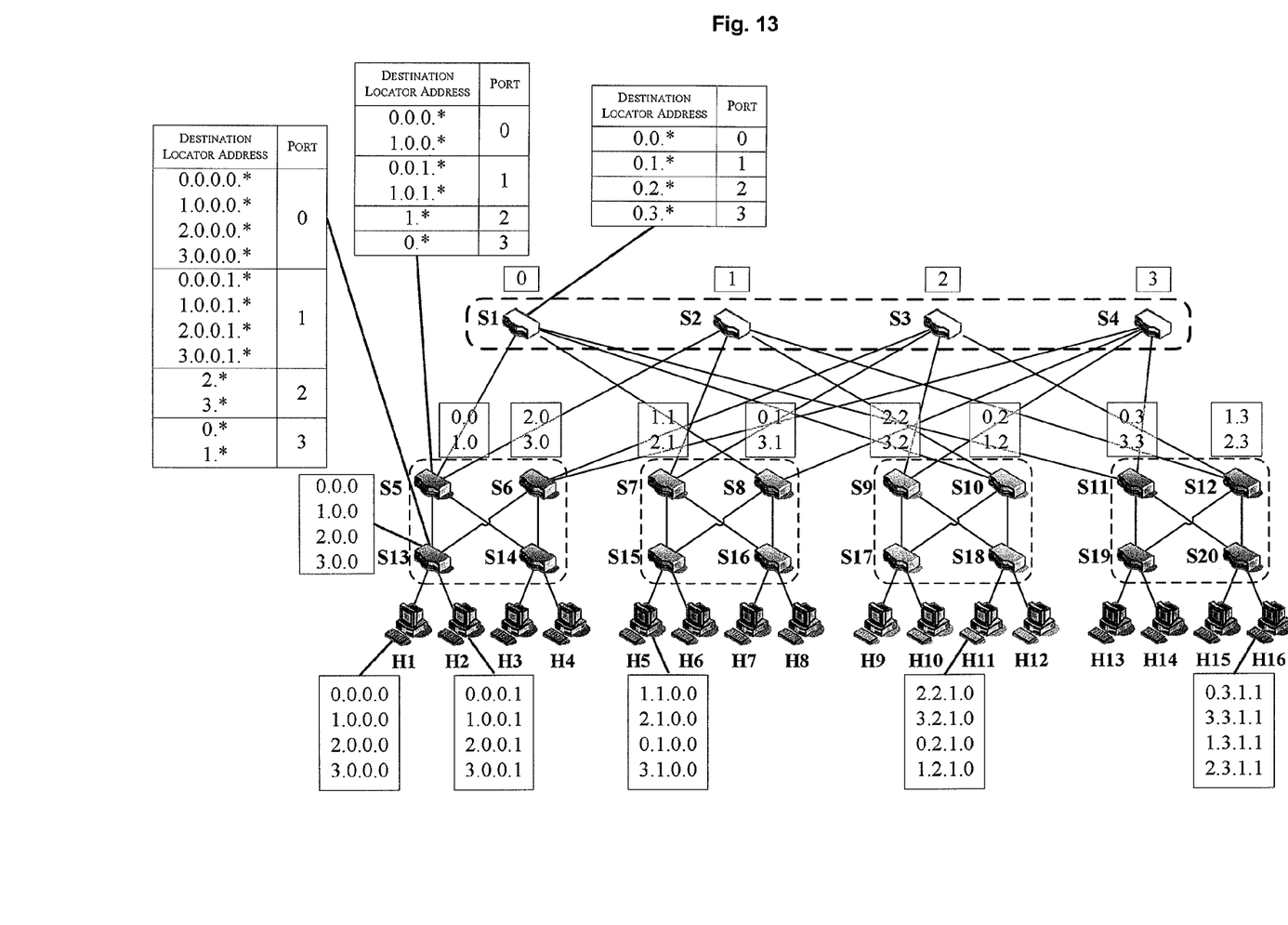
FIG. 13 is a schematic diagram for illustrating forwarding of data packets in Fat Tree topology.

The locator addresses but not the MAC addresses are stored in a forwarding table of a switch for forwarding data packets. FIG. 13 is a schematic diagram for illustrating forwarding of data packets in Fat Tree topology. Forwarding tables of switches in the respective layers are as follows:

Root Switch: selflocator.port.*↔ port "port" wherein "selflocator" represents root switch locator address of root switch itself, and "port" represents the next address field located after the root switch locator address. For example, "selflocator" of root switch S1 is "0". Its port 0 is connected to S5, and the first layer address assigned to S5 is also "0". Thus, data packet having destination locator addresses of "0.0.*" are sent to port 0. Similarly, data packet having destination locator addresses of "0.1.*" are sent to port 1.

The $i^{th}$ layer Switch: selflocator.port.*↔ port "port" parent's root.*↔ port connected to the (i−1)$^{th}$ layer switch wherein "selflocator" represents $i^{th}$ layer switch locator address of $i^{th}$ layer switch itself, "port" represents the next address field located after the $i^{th}$ layer switch locator address, and "parent's root" represents root switch locator address of root switch of (i−1)$^{th}$ layer switch connected to the $i^{th}$ layer switch. For example, "selflocator" of switch S5 are "0.0" and "1.0". Its port 0 is connected to S13, and the second layer address assigned to S13 is also "0". Thus, data packet having destination locator addresses of "selflocator.0.*" are sent to port 0 (i.e. "0.0.0.*"↔ port 0, "1.0.0."↔ port 0). Similarly, data packet having destination locator addresses of "selflocator.1.*" are sent to port 1 (i.e. "0.0.1.*"↔ port 1, "1.0.1.*"↔ port 1). Ports 2 and 3 of switch S5 are uplink ports and connected to (i−1)$^{th}$ layer switches. The (i−1)$^{th}$ layer switch connected to ports 2 and 3 of switch S5 is called parent switch of switch S5. Thus, switch S5 has two parent switches, S1 and S2. Assuming that switch S2 is connected to port 2 of switch S5 and root node of switch S2 is S2 itself (root switch locator address is "1" (parent's root)). Accordingly, the corresponding forwarding table entry is "1.*"↔ port 2. Likewise, switch S1 is connected to port 3 of switch S5 and root node of switch S1 is S1 itself (root switch locator address is "0" (parent's root)). Accordingly, the corresponding forwarding table entry is "0.*"↔ port 3. In another example, "selflocator" of switch S13 are "0.0.0", "1.0.0", "2.0.0", and "3.0.0". Its port 0 is connected to host H1, and the host locator address assigned to H1 is also "0". Thus, data packet having destination locator addresses of "selflocator.0.*" are sent to port 0 (i.e. "0.0.0.0.*"↔ port 0, "1.0.0.0.*"↔ port 0, "2.0.0.0.*"↔ port 0, "3.0.0.0.*"↔ port 0). Similarly, data packet having destination locator addresses of "selflocator.1.*" are sent to port 1 (i.e. "0.0.0.1.*"↔ port 1, "1.0.0.1.*"↔ port 1, "2.0.0.1.*"↔ , port 1, "3.0.0.1.*"↔ port 1). Ports 2 and 3 of switch S13 are uplink ports and connected to (i−1)$^{th}$ layer switches. The (i−1)$^{th}$ layer switch connected to ports 2 and 3 of switch S13 is called parent switch of switch S13. Thus, switch S13 has two parent switches, S5 and S6. Assuming that switch S6 is connected to port 2 of switch S13 and root node of switch S6 is root switch S3 (root switch locator address is "2" (parent's root)) or root switch S4 (root switch locator address is "3" (parent's root)). Accordingly, the corresponding forwarding table entries are "2.*"↔ port 2 and "3.*"↔ port 2. Likewise, switch S5 is connected to port 3 of switch S13 and root node of switch S5 is root switch S1 (root switch locator address is "0" (parent's root)) or root switch S2 (root switch locator address is "1" (parent's root)). Accordingly, the corresponding forwarding table entries are "0.*"↔ port 3 and "1.*"↔ port 3.

When the topology provides redundant paths, the switches and the hosts are assigned multiple locator addresses. The multiple locator addresses indicate multiple paths respectively. Appropriate paths may be selected from the multiple paths for load balance.

Figure 14:
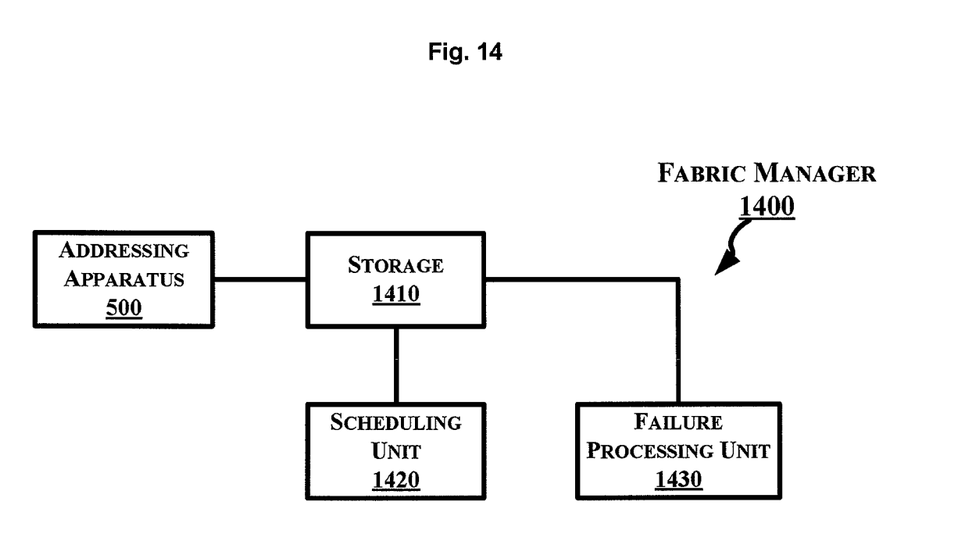
FIG. 14 is a block diagram of an example fabric manager 1400 comprising the addressing apparatus 500 according to the present disclosure.
Figure 15:
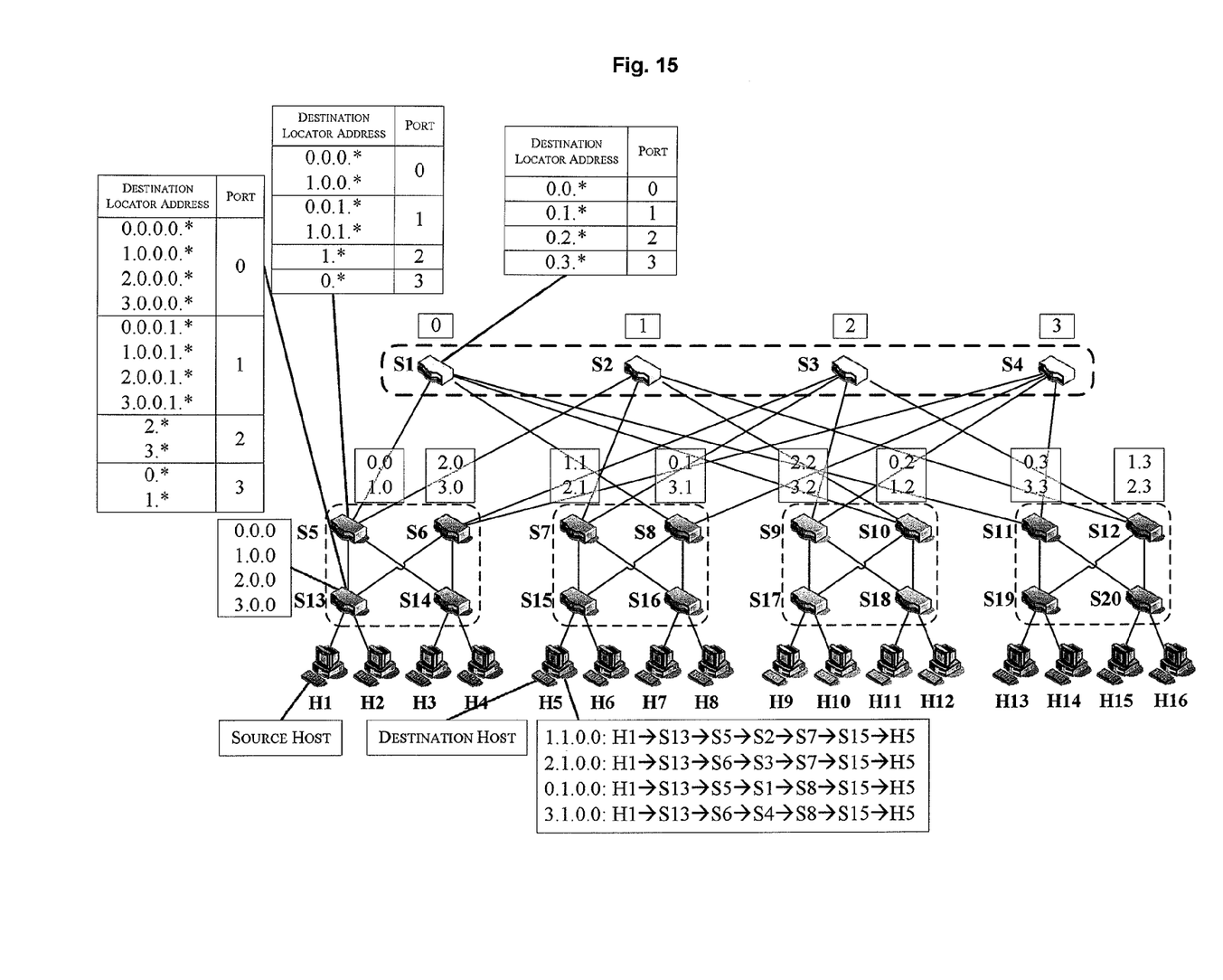
FIG. 15 is a schematic diagram for showing a plurality of locator addresses corresponding to a plurality of paths respectively.

FIG. 14 is a block diagram of an example fabric manager 1400 comprising the addressing apparatus 500 according to the present disclosure. FIG. 15 is a schematic diagram for showing a plurality of locator addresses corresponding to a plurality of paths respectively.

As shown in FIG. 14, the fabric manager 1400 comprising the addressing apparatus 500 according to the present disclosure further comprises: a storage 1410, a scheduling unit 1420, and a failure processing unit 1430.

The storage 1410 stores a global locator address table which includes mappings between an Internet Protocol (IP) address of each host and all host locator addresses of the host created by the addressing apparatus 500.

The scheduling unit 1420 searches the global locator address table with an IP address of a destination host as an index upon an Address Resolution Protocol (ARP) request is received, and based on a scheduling algorithm, selecting one host locator address among the searched out one or more host locator addresses corresponding to the IP address of the destination host, and returning the selected one host locator address to a source host to complete ARP address resolution. If no host locator address corresponding to the IP address of the destination host is searched out from the global locator address table, the scheduling unit 1420 performs a network broadcast to obtain one or more host locator addresses of the destination host (mappings between the one or more host locator addresses and IP addresses of destination hosts may be stored in a global locator table) and then, based on a scheduling algorithm, selects one host locator address among the obtained one or more host locator addresses corresponding to the IP address of the destination host, and returns the selected one host locator address to the source host to complete ARP address resolution.

When a switch detects its adjacent switch failure or link failure occurs, the failure processing unit 1430 invalidates a relevant host locator address in the global locator address. Then, the scheduling unit 1420 will not select an invalidated host locator address upon selecting a host locator address corresponding to the IP address of the destination host.

As shown in FIG. 15, host H1 is a source host and host H5 is a destination host. The host H5 has four locator addresses. Accordingly, there are four paths from host H1 to host H5, as also shown in FIG. 15. A global locator address table (stored in the storage 1410) stores all host locator addresses of all the hosts. When an Address Resolution Protocol (ARP) request is received by the fabric manager, the scheduling unit 1420 may respond by selecting one host locator address among the host locator addresses. Selecting host locator address corresponds to selecting one path from multiple paths. Appropriate paths may be selected from the multiple paths for load balance. The selecting method may comprise Random, Round Robin, or other scheduling algorithms. The fabric manager stores a global locator address table for the ARP address resolution. The fabric manager searches the global locator address table for a host locator address corresponding to an IP address of a destination host upon an ARP request is received. If one or more host locator address corresponding to an IP address of a destination host is found, one host locator address may be selected from the searched one or more host locator address based on the scheduling algorithm, and the selected one host locator address is returned to a source host to complete ARP address resolution. If no host locator address corresponding to the IP address of the destination host is searched out from the global locator address table, the fabric manager performs a network broadcast to obtain one or more host locator addresses of the destination host and then, based on the scheduling algorithm, selects one host locator address among the obtained one or more host locator addresses, and returns the selected one host locator address to the source host to complete ARP address resolution. For a majority of cases, a whole network broadcast is not necessary due to the involvement of the fabric manager.

Additionally, because a data center contains tens of thousands of servers and switches and concurrently supports multiple distinct applications, the requirement of fault tolerance of a data center network is high. The present disclosure employs one or more switch locator addresses corresponding to a switch so as to provide fault tolerance easily. Keep Alive messages are exchanged among the switches regularly to detect operation status of neighbor switches (which may be achieved by a failure detecting unit in a switch). If there is a fault in a switch or a link, a failure detecting unit in a neighbor switch may detect this fault and report it to the fabric manager. The failure processing unit 1430 then invalidates a relevant host locator address in the global locator address table. Thus, the scheduling unit 1420 will select a valid host locator address rather than an invalidated host locator address upon processing of subsequent ARP requests to complete ARP address resolution.

Other arrangements of the present disclosure include software programs performing the steps and operations of the method embodiments, which are firstly generally described and then explained in detail. More specifically, a computer program product is such an embodiment, which comprises a computer-readable medium with a computer program logic encoded thereon. The computer program logic provides corresponding operations to provide the above-described 3D positioning solution when it is executed on a computer device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g. CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g. a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

It should be noted that, concisely, the embodiments of the present disclosure can be implemented as software programs, software and hardware on a data processing device, or individual software and/or individual circuit.

The present disclosure has been described in connection with embodiments. It should be understood that those skilled in the art can make various other changes, alternations, and supplementations without departing from the spirit and scope of the present disclosure. Therefore, the scope of the present disclosure is not limited to the above specific embodiments, but is defined by the following claims.

What is claimed is:

1. An addressing apparatus, comprising:
a tree creating unit for, sequentially with each of switches as a root, creating a tree containing all hosts by means of network topology discovery function, to obtain a plurality of trees;
a tree selecting unit for selecting a tree having a minimum height among the plurality of trees created by the tree creating unit; and
an address assigning unit for assigning addresses to each of switches and each of hosts in a network with respect to each tree having the minimum height selected by the tree selecting unit.

2. The addressing apparatus according to claim 1, wherein when several trees containing all the hosts are able to be created with one switch as a root, the tree creating unit selects any one of trees having the minimum height among the several trees with the switch as the root to be the created tree.

3. The addressing apparatus according to claim 1, wherein when several trees containing all the hosts are able to be created with one switch as a root, the tree creating unit records all of the several trees to be the created tree.

4. The addressing apparatus according to claim 1, wherein when there are several trees having the minimum height among the plurality of trees, the tree selecting unit selects all of the several trees having the minimum height.

5. The addressing apparatus according to claim 1, wherein for each tree having the minimum height H selected by the tree selecting unit, the address assigning unit assigns a root switch locator address to a root switch located at the root of the tree, which root switch is also called as the $0^{th}$ layer switch;

beginning with the $1^{st}$ layer switches directly connected to the root switch, for each $i^{th}$ layer switch directly connected to the $(i-1)^{th}$ layer switch, finds all paths from the root switch to the $i^{th}$ layer switch, and with respect to each path, assigns an $i^{th}$ layer switch locator address to the $i^{th}$ layer switch with a format of "root switch locator address.$1^{st}$ layer switch address . . . $i^{th}$ layer switch address", wherein $1 \leq i \leq H-2$; and assigns a host locator address to each host with a format of "edge switch locator address.host address", wherein the edge switch is the $k^{th}$ layer switch directly connected to the host, $0 \leq k \leq H-2$.

6. The addressing apparatus according to claim 5, wherein the $i^{th}$ layer switch address is a port number of a respective port connecting to each $i^{th}$ layer switch of the $(i-1)^{th}$ layer switch.

7. The addressing apparatus according to claim 5, wherein the host address is a port number of a respective port connecting to each host of the edge switch.

8. An addressing method, comprising:

sequentially with each of switches as a root, creating a tree containing all hosts by means of network topology discovery function, to obtain a plurality of trees;

selecting a tree having a minimum height among the created plurality of trees; and assigning addresses to each of switches and each of hosts in a network with respect to each selected tree having a minimum height.

9. The addressing method according to claim 8, wherein when several trees containing all the hosts are able to be created with one switch as a root, any one of trees having the minimum height among the several trees with the switch as the root is selected to be the created tree.

10. The addressing method according to claim 8, wherein when several trees containing all the hosts are able to be created with one switch as a root, all of the several trees are recorded to be the created tree.

11. The addressing method according to claim 8, wherein when there are several trees having the minimum height among the plurality of trees, all of the several trees having the minimum height are selected.

12. The addressing method according to claim 8, wherein for each selected tree having the minimum height H, a root switch locator address is assigned to a root switch located at the root of the tree, which root switch is also called as the $0^{th}$ layer switch;

beginning with the $1^{st}$ layer switches directly connected to the root switch, for each $i^{th}$ layer switch directly connected to the $(i-1)^{th}$ layer switch, all paths are found from the root switch to the $i^{th}$ layer switch, and with respect to each path, an $i^{th}$ layer switch locator address is assigned to the $i^{th}$ layer switch with a format of "root switch locator address.$1^{st}$ layer switch address . . . $i^{th}$ layer switch address", wherein $1 \leq i \leq H-2$; and a host locator address is assigned to each host with a format of "edge switch locator address.host address", wherein the edge switch is the $k^{th}$ layer switch directly connected to the host, $0 \leq k \leq H-2$.

13. The addressing method according to claim 12, wherein the $i^{th}$ layer switch address is a port number of a respective port connecting to each $i^{th}$ layer switch of the $(i-1)^{th}$ layer switch.

14. The addressing method according to claim 12, wherein the host address is a port number of a respective port connecting to each host of the edge switch.

15. A fabric manager, comprising:

the addressing apparatus according to claim 1; and a storage for storing a global locator address table which includes mappings between an Internet Protocol (IP) address of each host and all host locator addresses of the host.

16. The fabric manager according to claim 15, further comprising:

a scheduling unit for searching the global locator address table with an IP address of a destination host as an index upon an Address Resolution Protocol (ARP) request is received, and based on a scheduling algorithm, selecting one host locator address among the searched out one or more host locator addresses corresponding to the IP address of the destination host, and returning the selected one host locator address to a source host to complete ARP address resolution.

17. The fabric manager according to claim 16, wherein if no host locator address corresponding to the IP address of the destination host is searched out from the global locator address table, the scheduling unit performs a network broadcast to obtain one or more host locator addresses of the destination host, and then, based on a scheduling algorithm, selects one host locator address among the obtained one or more host locator addresses corresponding to the IP address of the destination host, and returning the selected one host locator address to the source host to complete ARP address resolution.

18. The fabric manager according to claim 16, further comprising:

a failure processing unit for, upon a switch's detecting its adjacent switch failure or link failure, invalidating a relevant host locator address in the global locator address, wherein the scheduling unit will not select an invalidated host locator address upon selecting a host locator address corresponding to the IP address of the destination host.

19. A switch comprising the addressing apparatus according to claim 1.

20. A data routing method in which switch addresses and host addresses addressed by the addressing method according to claim 14 are adopted, the data routing method comprising:

a root switch sends a data packet containing "root switch locator address.$1^{st}$ layer switch address.*" as a host locator address of a destination host to a port numbered as "$1^{st}$ layer switch address";

an $i^{th}$ layer switch sends a data packet containing "$i^{th}$ layer switch locator address.$(i+1)^{th}$ layer switch address.*" as a host locator address of a destination host to a port numbered as "$(i+1)^{th}$ layer switch address", wherein $1 \leq i \leq H-2$; and an $i^{th}$ layer switch sends a data packet containing "root switch locator address.*" as a host locator address of a destination host to a port connected to an $(i-1)^{th}$ layer switch whose root is a root switch having a root switch locator address of "root switch locator address", wherein $1 \leq i \leq H-2$.

* * * * *